United States Patent [19]

Peterson

[11] Patent Number: 5,194,288

[45] Date of Patent: Mar. 16, 1993

[54] SYRUP FOR CONFECTIONS AND METHOD FOR USING SAME

[75] Inventor: Benjamin R. Peterson, West Chicago, Ill.

[73] Assignee: Universal Foods Corporation, Milwaukee, Wis.

[21] Appl. No.: 704,829

[22] Filed: May 23, 1991

[51] Int. Cl.$^5$ ............................................. A23L 1/09
[52] U.S. Cl. .................. 426/658; 426/271; 426/565; 426/575; 426/660
[58] Field of Search .............. 426/658, 660, 575, 565, 426/271, 74

[56] References Cited

U.S. PATENT DOCUMENTS

| 2,400,834 | 5/1946 | Gloahec | 426/575 |
|---|---|---|---|
| 2,426,125 | 8/1947 | Steiner | 536/3 |
| 3,057,734 | 10/1962 | Pader | 426/658 |
| 3,282,707 | 11/1966 | Topalian et al. | 426/658 |
| 3,362,833 | 1/1968 | Smith | 426/658 |
| 3,914,440 | 10/1975 | Witzig | 426/565 |
| 3,982,003 | 9/1976 | Mitchell et al. | 426/271 |
| 4,073,963 | 2/1978 | Daggy | 426/658 |
| 4,152,466 | 5/1979 | Deretchin | 426/658 |
| 4,347,261 | 8/1982 | Challen et al. | 426/575 |
| 4,394,399 | 7/1983 | Keyser et al. | 426/658 |
| 4,443,482 | 4/1984 | Schopf et al. | 426/654 |
| 4,528,205 | 9/1985 | Turrisi | 426/658 |
| 4,725,445 | 2/1988 | Ferrero | 426/565 |
| 4,786,521 | 11/1988 | Bennett et al. | 426/804 |

OTHER PUBLICATIONS

H. D. Graham, "Food Colloids", The AVI Publishing Co., Inc., pp. 448–450 (1977).

A Product Bulletin Titled "Alginate Products for Scientific Water Control", Kelco (3d Edition, Rev. Apr. 1987).

Technical Bulletin DB-10 for Kelton HV and Kelton LV, Kelco.

Technical Supplement 2, "Calcium Salts in Algin Gel Systems", Kelco.

Technical Supplement 3, "Sequestrants Commonly Used with Alginate Systems", Kelco.

Technical Supplement 4, "Reversible Sequestrant Algin Gel System", Kelco.

Primary Examiner—R. B. Penland
Attorney, Agent, or Firm—Willian Brinks Olds Hofer Gilson & Lione

[57] ABSTRACT

A syrup composition that has a sufficiently low viscosity so that it can be poured or pumped, yet upon contact with a confection the syrup composiiton's viscosity increases.

19 Claims, No Drawings

SYRUP FOR CONFECTIONS AND METHOD FOR USING SAME

BACKGROUND OF THE INVENTION

The present invention generally relates to a syrup having a sufficiently low viscosity so that it can be poured or pumped, yet having a high viscosity upon contact with a confection, for example, a frozen confection, to produce a flavored confection. The invention also relates to a method of using such a syrup.

"Frozen confection" is a generic term applied to a wide variety of products including hard and soft serve ice cream, hard frozen and soft serve ice milks, sherbets, mellorines, and hard and soft frozen yogurts.

The present invention allows a dispenser of frozen confections to simply and economically provide a wide variety of flavors of frozen confections. For example, the syrup of the present invention may be used in a flavor dispensing device such as the one disclosed in U.S. Pat. No. 4,793,520.

SUMMARY OF THE INVENTION

The present invention provides a syrup whose viscosity increases upon contact with a confection, such as a frozen confection. The syrup comprises an amount of at least one sweetener contributing from about 25 to about 60 percent sugar solids by weight of the total syrup, an amount of at least one sequestrant sufficient to sequester or complex substantially all the hardness present in the ingredients making up the syrup, an amount of at least one alginate sufficient to thicken the syrup upon contact with a confection containing calcium, and water, which comprises the balance. The invention also relates to the method of using the syrup.

It is noted that, unless otherwise stated, all percentages given in this specification and the appended claims refer to percentages by weight.

DETAILED DESCRIPTION OF THE PREFERRED EMBODIMENTS

The syrup of the preferred embodiment comprises a sweetener, a sequestrant, an alginate and water. The syrup of this embodiment initially exhibits a viscosity greater than water but sufficiently low so that it can be pumped. Yet, when the syrup contacts a frozen confection its viscosity increases.

The syrup comprises primarily a sweetener and water with the sweetener used in an amount such that it contributes from about 25 to about 60 percent sugar solids by weight of the syrup. A single sweetener or a mixture of one or more sweeteners can be used. Although other ingredients may also contribute sugar solids to the syrup their contribution compared to that contributed by the sweetener is relatively small. The preferred sweeteners are cane or beet sucrose, dextrose, glucose, maltose, fructose, high fructose corn sweeteners, high or low conversion corn syrups, glycerine, sorbitol, mannitol, polydextrose, and mixtures thereof. It is understood that the sweetener can be provided in either a dry or a liquid form.

It is contemplated that sweeteners such as aspartame and other high intensity sweeteners may be used. When these types of sweeteners are used, bulking agents, such as polydextrose, maltodextrin, sorbitol, mannitol, maltitol, dextrin, starch or other similar low intensity sweeteners, are typically added in an amount so that they contribute from about 5 to about 30 percent sugar solids. Of course it is likely that the amount of water used, as well as the amount of the other ingredients, will differ when high intensity sweeteners are used compared to when the sweeteners described above are used.

Typically, the amount of sweetener used contributes from about 25 to about 60 percent sugar solids in the syrup. Preferably, when a fruit or a chocolate flavor is being prepared, the sweetener used contributes from about 30 to about 50 percent sugar solids in the syrup. Preferably, when nonfruit flavors are being prepared, the sweetener used contributes from about 35 to about 60 percent sugar solids in the syrup.

The syrup also comprises an amount of a sequestrant sufficient to complex substantially all the hardness present in the ingredients comprising the syrup. The term "hardness" generally refers to the concentration of calcium and magnesium salts in water. As used in this specification and appended claims, "hardness" refers to the compounds of, the alkaline earth ions which include calcium and magnesium, the heavy metal ions, iron, copper, aluminum, and the like.

The sequestrants useful in the invention are of two types. The first type acts as a buffer in an acid system and can sequester hardness in slightly acid systems. In addition, these types of sequestrants act as a reversible sequestrant when going from near neutral conditions to slightly acidic conditions. Sequestrants of this type are sodium citrate, potassium citrate, disodium phosphate and mixtures thereof. Preferably, sodium citrate is used.

The second type of sequestrant sequesters hardness without appreciably altering the pH of the system. Generally, these sequestrants are not reversible sequestrants. Sequestrants of this type are the phosphate, polyphosphate, and carbonate compounds. Sodium hexametaphosphate is preferred, although potassium hexametaphosphate, sodium and potassium acid pyrophosphate, trisodium and tripotassium phosphate, tetrasodium and tetrapotassium pyrophosphate, sodium and potassium tripolyphosphate, and sodium and potassium carbonate are contemplated.

In one embodiment, the sequestrant is a mixture of the two types of sequestrants. Preferably, a combination of sodium citrate and sodium hexametaphosphate is used. In another embodiment, only the second type of sequestrant is used, preferably, sodium hexametaphosphate.

Of course, the amount of sequestrant sufficient to sequester or complex substantially all of the hardness present in the ingredients comprising the syrup will depend primarily on the hardness of the water and on the amount of water used in making the syrup. Referring to a particular embodiment where tap water from Carol Stream, Illinois is used, in which the tap water is drawn from any of a number of different wells and has a hardness level from about 150 to about 540 milligrams per liter (as $CaCO_3$), and in which the sequestrant is a mixture of the two types of sequestrants, it has been found that the amount of the first type of sequestrant ranges from about 0.1 to about 4.0 percent. Preferably, when a fruit flavor is being prepared, the first type of sequestrant is used at a level up to about 4.0 percent. When a non-fruit flavor is being prepared, the amount of the first type of sequestrant is preferably at a level up to about 0.5 percent. The amount of the second type of sequestrant used ranges from about 0.2 to about 0.6 percent.

Referring to a particular embodiment where the tap water from Carol Stream, Illinois, described above, is used and where the sequestrant used is only the second type, it has been found that the amount of sequestrant sufficient to sequester or complex substantially all of the hardness present in the syrup's ingredients ranges from about 0.2 to about 3 percent. Preferably, the amount used ranges from about 0.2 to about 1.5 percent.

The syrup also contains an alginate. Alginates include the sodium, potassium, ammonium, and mixed salts of alginic acid and ester derivatives. Particularly preferred are the low viscosity alginates commercially available from the Kelco Company under the designations Kelgin XL, Manutex RH, Mannutex RD, Keltone LV, Mannugel GHB, Kelgin QL. In accordance with the most preferred embodiment, Keltone LV, a sodium alginate, is used.

It is contemplated that other compounds which react in a fashion similar to the alginates and have a comparable viscosity as the identified Kelco alginates can be used. It is also contemplated that calcium reactive pectins and calcium reactive carrageenan would be useful in the present invention.

It is known that alginates are used as a thickening, suspending, stabilizing, binding, and gelling agent when reacted with the alkaline earth or heavy metal ions, which include calcium ions. Thus, the amount of sequestrant used must be sufficient to sequester substantially all the hardness, which includes calcium, present in the ingredients used in making the syrup so that the alginate does not react with the hardness ions to prematurely thicken the syrup such that the syrup could no longer be pumped or poured. Because substantially all the hardness present in the composition is sequestered by the sequestrant, the alginate is able to react with the calcium present in the frozen confection and thereby produce a thick or viscous syrup upon contact with that frozen confection.

Preferably, the sequestrant, for the hardness present in the syrup, is used in an amount insufficient to interfere with the thickness of the syrup produced upon reaction of the alginate with the calcium in the frozen confection. Thus, while a sufficient amount of sequestrant is employed to sequester substantially all the hardness in the syrup, excessive amounts of sequestrant that would interfere with the thickening reaction between the alginate and the calcium in the frozen confection should be avoided.

An amount of at least one alginate sufficient to thicken the syrup upon contact with a confection containing calcium is used. Of course, the amount of alginate sufficient to thicken the syrup upon contact with a confection containing calcium will vary depending upon the amount of calcium present in the confection. The approximate amount of calcium present in frozen confections ranges from about 40 milligrams (mg.) per 100 grams (gm.) of the confection for sherbets to over 200 mg./100 gm. for ice milk. Typically, the approximate amount of calcium present in ice cream ranges from about 105 mg. to about 140 mg. per 100 gm. of ice cream.

It has been found that for soft-serve ice cream the amount of alginate useful in the syrup ranges from about 0.5 to about 1.0 percent. Preferably, the amount ranges from about 0.7 to about 0.9 percent. In accordance with the most preferred embodiment, the amount of alginate ranges from about 0.7 to about 0.8 percent.

Except for optional ingredients, which will be described below, water comprises the balance of the syrup. Generally, the amount of water needed will depend on the type of sweetener used, as described above, and ranges from about 25 to about 60 percent. When a fruit or chocolate flavor is being prepared with the preferred sweeteners, the amount of water used ranges from about 40 to about 60 percent. Preferably, the amount of water ranges from about 46 to about 48 percent.

When nonfruit flavors are being prepared with the preferred sweeteners, the amount of water used ranges from about 25 to about 45 percent. Preferably, the amount of water ranges from about 30 to about 45 percent.

In the most preferred embodiment, the syrup is used in a flavor dispensing device such as that shown in U.S. Pat. No. 4,793,520. In that device the syrup is mixed with a frozen confection in a rotor chamber which is attached to the outlet of the dispenser. The syrup's viscosity is initially sufficiently low so that it can be pumped. However, the syrup's viscosity increases upon contact with the frozen confection so that the final mixture presents the visual effect of swirls or stripes in the frozen confection.

When a chocolate flavor is desired, xanthan gum, lecithin, and glycerine may be used. It appears that the use of xanthan gum retards the settling of the cocoa. Generally, the xanthan gum is present in the chocolate flavored syrup up to about 0.1 percent. Preferably, the xanthan gum is present up to about 0.05 percent.

Optional ingredients may include acidulents, starch, natural and artificial flavor ingredients and color ingredients as well as any other ingredient added to enhance the flavor, appearance, texture or other such desirable consumer attributes.

Acidulents such as citric acid, maleic acid, tartaric acid, lactic acid, benzoic acid, phosphoric acid, gluconic acid, sorbic acid as well as the salts of these acids including potassium sorbate and sodium benzoate, and mixtures thereof can be used. It is recognized that these acidulents also act as preservatives. Generally, the acidulent is used in amounts ranging from about 0.1 to about 2 percent.

Starches such as modified food starches, including modified waxy maize, tapioca, corn starches and mixtures thereof may be used. Preferably, a modified food starch sold by Staley under the designation "MIRA-CLEER 340" is used.

Generally, the amount of starch used is up to about 0.6 percent. Preferably, when a fruit flavor or a chocolate flavor syrup is prepared, the amount of starch used ranges from about 0.3 to about 0.6 percent. When nonfruit flavors are prepared, the amount of starch used is preferably up to about 0.5 percent.

Any natural or artificial flavor ingredient contributing a pleasant taste can be added to the syrup of this invention. Fruit flavors such as strawberry, peach, pineapple, cherry, raspberry, lime, and bubble gum may be prepared. In addition, other nonfruit flavors such as chocolate, caramel, butterscotch may be prepared. It is contemplated that any flavor desired by the consumer may be prepared. Typically, when natural flavors are used, the amount to be added to the syrup composition is higher than if artificial flavors or a mixture of artificial and natural flavors are used. Preferably, the flavor ingredient is a mixture of natural and artificial flavors.

Generally, the amount of flavor ingredient used in the syrup composition is up to about 8 percent. Preferably, when a fruit flavor is being prepared, a mixture of artificial and natural flavors in the range from about 0.5 to about 5 percent is used. When a nonfruit flavor is being prepared, a mixture of artificial and natural flavors in the range from about 3 to about 8 percent is preferred.

Although the syrup may be prepared in any suitable manner, the following is the preferred method. The sequestrant and preservatives, if any, are mixed and added to substantially all of the water with agitation. Preferably, warm water of about 110° F. is used. The sequestrants, when dissolved, should complex or sequester substantially all the hardness present in the water.

The starch, if desired, is added to the water. Then, a dry blend of the sweetener and alginate is prepared, preferably in a ratio of sweetener to alginate of about 10:1. The dry blend is then added to the liquid mixture using high speed agitation. The resulting mixture is then pumped to a cooking vessel where, using agitation, the balance of the sweetener is added.

Thereafter, the acidulents are mixed, using vigorous agitation, with the balance of the water, to ensure they are dissolved. The dissolved acidulents are combined with the above liquid mixture. The flavor ingredients and coloring, if desired, are added last.

The final mixture is pumped to an aseptic system where it is heated, preferably to about 200° F. for about 1 to about 7 minutes. Thereafter, the mixture is pumped through cooling equipment to cool the mixture to about 80° to 100° F.

Typically, the final mixture, after cooling, has a pH in the range from about 3.0 to about 5.0. Preferably, the pH for fruit flavors ranges from about 3.0 to about 4.7. More preferably, the pH ranges from about 3.1 to about 3.5. For a chocolate flavor the pH is about 4.3. Preferably, the pH for nonfruit flavors ranges from about 4.1 to about 4.5.

In another embodiment of the invention, it is contemplated that the syrup composition may be poured directly on top of the frozen confection. In this embodiment, the syrup will, upon contact with the frozen confection, thicken and produce a thick topping.

In another embodiment, it is contemplated that the syrup can be used in a soft-serve or frozen shake or malt to provide different flavors.

EXAMPLES

The following examples are provided by way of explanation and illustration. As such, these examples are not to be viewed as limiting the scope of the invention as defined by the appended claims.

EXAMPLE 1

A strawberry flavored syrup having the following composition was prepared according to the preferred method.

| Ingredient | Amount (%) |
|---|---|
| Sweetener | 43.5 |
| (Sucrose) | |
| Water | 47.3 |
| Sequestrant | |
| (Sodium Hexametaphosphate) | 1.4 |
| (Sodium Citrate) | 0.1 |
| Acidulent | |
| (Potassium Sorbate) | 0.1 |
| (Citric Acid) | 1.5 |
| Alginate | 0.8 |
| (Keltone LV) | |
| Starch | 0.5 |
| (Miracleer 340) | |

| Ingredient | Amount (%) |
|---|---|
| -continued | |
| Flavor Ingredient | 4.4 |
| (natural and artificial flavors) | |
| Color Ingredient | 0.4 |
| | 100.0 |

EXAMPLE 2

A butterscotch flavored syrup having the following composition was prepared according to the preferred method.

| Ingredient | Amount (%) |
|---|---|
| Sweetener | 55.00 |
| (Sucrose) | |
| Water | 40.161 |
| Sequestrant | |
| (Sodium Hexametaphosphate) | 0.30 |
| (Sodium Citrate) | 0.26 |
| Alginate | 0.6 |
| (Keltone LV) | |
| Acidulent | |
| (Glucono Delta Lactone) | 0.30 |
| (Sorbic Acid) | 0.19 |
| Salt | 1.0 |
| Flavor Ingredient | 2.15 |
| (nature and artificial flavors) | |
| Color Ingredient | 0.039 |
| | 100.000 |

Both of these syrups exhibited acceptable flavor characteristics as well as desired shelf-life stability.

It should be noted that all other modifications which are within the ordinary skill in the art to make are considered to lie within the scope of the invention as defined by the appended claims.

I claim:

1. A syrup that increases in viscosity upon contact with a calcium-containing frozen confection, consisting essentially of
   a. an amount of at least one sweetener contributing from about 25 to about 60 percent sugar solids, in water;
   b. an amount of at least one suquestrant sufficient to complex substantially all the hardness present in the syrup wherein the sequestrant is a combination of a first type and a second type, the first type being optional and selected from the group consisting of sodium citrate, potassium citrate, disodium phosphate and mixtures thereof, the second type being selected from the group consisting of phosphate, polyphosphate, and carbonate compounds; and
   c. an amount of at least one low viscosity alginate sufficient to thicken the syrup upon contact with the calcium-containing frozen confection, the alginate being selected from the group consisting of sodium, potassium, and ammonium salts and mixtures thereof.

2. The syrup of claim 1 wherein said alginate is selected from the group consisting of sodium alginate, potassium alginate, ammonium alginate, and mixtures thereof.

3. The syrup of claim 1 wherein said sequestrant is a polyphosphate.

4. The syrup of claim 1 wherein said sequestrant is sodium hexametaphosphate.

5. The syrup of claim 1 wherein said sequestrant is a combination of sodium citrate and hexametaphosphate.

6. The syrup of claim 1 wherein the syrup is applied to a frozen confection that contains at least about 40 milligrams of calcium per 100 grams of confection.

7. A syrup that increases in viscosity upon contact with a calcium-containing frozen confection, consisting essentially of
   a. an amount of at least one sweetener contributing from about 25 to about 60 percent sugar solids, in water;
   b. an amount of at least one sequestrant sufficient to complex substantially all the hardness present in the syrup, the sequestrant being of a second type and consisting of sodium hexametaphosphate at a level of at least about 0.2 percent; and,
   c. an amount of a low viscosity alginate sufficient to cause thickening of the syrup upon contact with the calcium-containing frozen confection, the alginate being selected from the group consisting of the sodium, potassium, and ammonium salts and mixtures thereof.

8. The syrup of claim 7 wherein the amount of sodium hexametaphosphate ranges from about 0.2 to about 1.5 percent.

9. The syrup of claim 7 further consisting essentially of a second type of sequestrant, said second type of sequestrant being sodium citrate.

10. The syrup of claim 9 wherein the sodium citrate is at a level up to about 4 percent.

11. The syrup of claim 7 wherein the amount of said alginate is at least about 0.5 percent.

12. The syrup of claim 7 wherein said alginate is selected from the group consisting of sodium, potassium, and ammonium salts and mixtures thereof.

13. The syrup of claim 7 wherein the syrup is applied to a frozen confection that contains at least about 40 milligrams of calcium per 100 grams of confection.

14. A syrup that increases in viscosity upon contact with a calcium-containing frozen confection, consisting essentially of:
   a. an amount of at least one sweetener contributing from about 25 to about 60 percent sugar solids, in water;
   b. an amount of at least one sequestrant sufficient to complex substantially all the hardness present in the syrup wherein the sequestrant is a combination of a first type and a second type, the first type being optional and selected form the group consisting of sodium citrate, potassium citrate, disodium phosphate and mixtures thereof, the second type being selected from the group consisting of phosphate, polyphosphate, and carbonate compounds; and
   c. an amount of a low viscosity alginate selected from the group consisting of the sodium, potassium, and ammonium salts and mixtures thereof sufficient to cause thickening of the syrup upon contact with the calcium-containing frozen confection, the alginate present at a level of at least about 0.6 percent.

15. The syrup of claim 14 wherein the syrup is applied to a frozen confection that contains at least about 40 milligrams of calcium per 100 grams of confection 16. A syrup comprising:
   a. an amount of at least one sweetener contributing from about 25 to about 60 percent sugar solids;
   b. from about 25 to about 60 percent of water;
   c. an amount of at least one sequestrant sufficient to complex substantially all the hardness present in the syrup, wherein the sequestrant is sodium hexametaphosphate at a level from about 0.2 to about 1.5 percent;
   d. an amount of a low viscosity sodium alginate sufficient to cause thickening of the syrup upon contact with a calcium-containing frozen confection, the alginate present at a level from about 0.5 to about 1.0 percent;
   e. from about 1 to about 2 percent of at least one acidulent;
   f. from about 0.3 to about 0.6 percent of at least one starch; and,
   g. from about 1 to about 8 percent of a flavor ingredient.

17. A method which comprises applying a syrup to a frozen confection;
   a. said confection containing from at least about 40 milligrams of calcium per 100 grams of confection;
   b. said syrup consisting essentially of:
      i. water,
      ii. at least one sweetener,
      iii. at least one sequestrant in an amount sufficient to complex substantially all the hardness present in the syrup, wherein the sequestrant is a combination of a first type and a second type, the first type being optional and selected from the group consisting of sodium citrate, potassium citrate, disodium phosphate and mixtures thereof, the second type being selected from the group consisting of phosphate, polyphosphate, and carbonate compounds and
      iv. at least one low viscosity alginate in an amount sufficient to thicken said syrup upon contact of said syrup with the calcium in said confection.

18. The method of claim 17 in which said alginate is selected from the group consisting of sodium alginate, potassium alginate, ammonium alginate and mixtures thereof.

19. The method of claim 17 in which said alginate is sodium alginate.

* * * * *